(12) United States Patent
Unruh

(10) Patent No.: US 12,416,494 B2
(45) Date of Patent: Sep. 16, 2025

(54) METHOD FOR CALIBRATING A THZ MEASURING DEVICE AND EXTRUSION AND MEASUREMENT SYSTEM

(71) Applicant: CiTEX Holding GmbH, Melle (DE)

(72) Inventor: Andrej Unruh, Bird in Hand, PA (US)

(73) Assignee: CiTEX Holding GmbH, Melle (DE)

( * ) Notice: Subject to any disclaimer, the term of this patent is extended or adjusted under 35 U.S.C. 154(b) by 455 days.

(21) Appl. No.: 18/093,352

(22) Filed: Jan. 5, 2023

(65) Prior Publication Data

US 2023/0221113 A1 Jul. 13, 2023

Related U.S. Application Data

(60) Provisional application No. 63/297,310, filed on Jan. 7, 2022.

(51) Int. Cl.
*G01B 21/08* (2006.01)
*G01B 5/06* (2006.01)
*G01B 11/06* (2006.01)
*G01B 17/02* (2006.01)

(52) U.S. Cl.
CPC ............ *G01B 21/08* (2013.01); *G01B 5/068* (2013.01); *G01B 11/0691* (2013.01); *G01B 17/02* (2013.01)

(58) Field of Classification Search
CPC .... G01B 21/08; G01B 5/068; G01B 11/0691; G01B 17/02; G01B 11/06; G01B 11/08; G01B 21/042; B29C 2948/92114; B29C 48/0022; B29C 48/09; B29C 48/12; B29C 48/92

See application file for complete search history.

(56) References Cited

U.S. PATENT DOCUMENTS

| 2005/0213113 | A1* | 9/2005 | Sikora | G01B 11/2433 356/638 |
| 2008/0174788 | A1* | 7/2008 | Ehbets | G01J 3/02 356/402 |
| 2015/0323452 | A1 | 11/2015 | King | |
| 2020/0043226 | A1* | 2/2020 | Abe | G01B 11/24 |

FOREIGN PATENT DOCUMENTS

| DE | 102016119728 A1 | 4/2018 |
| DE | 102018128248 A1 | 5/2020 |
| DE | 102019119491 A1 | 1/2021 |
| DE | 202020005529 U1 | 10/2021 |
| WO | 2016139155 A1 | 9/2016 |
| WO | 2017000933 A1 | 1/2017 |
| WO | 2021259426 A1 | 12/2021 |

* cited by examiner

*Primary Examiner* — Huy Q Phan
*Assistant Examiner* — Carl F. R. Tchatchouang
(74) *Attorney, Agent, or Firm* — Barnes & Thornburg LLP

(57) ABSTRACT

The present disclosure relates to a method for calibrating a stationary THz measuring device which measures geometric properties of a profile by means of one or more THz sensors during an extrusion of the profile, comprising at least one or more steps.

17 Claims, 3 Drawing Sheets

Figure 2:
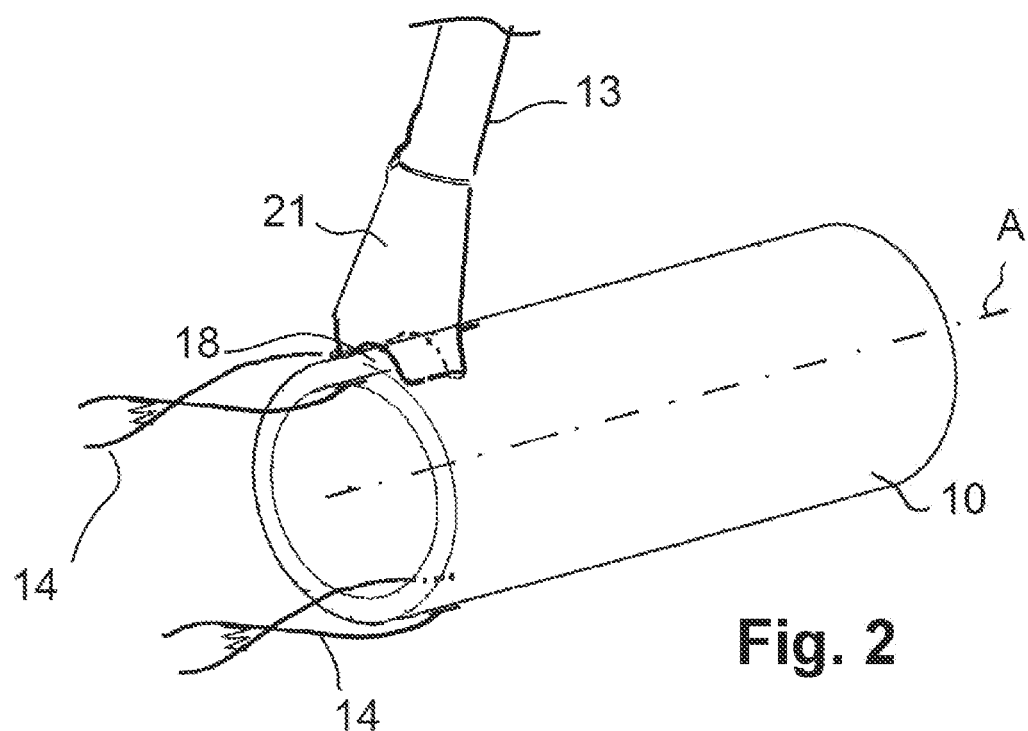

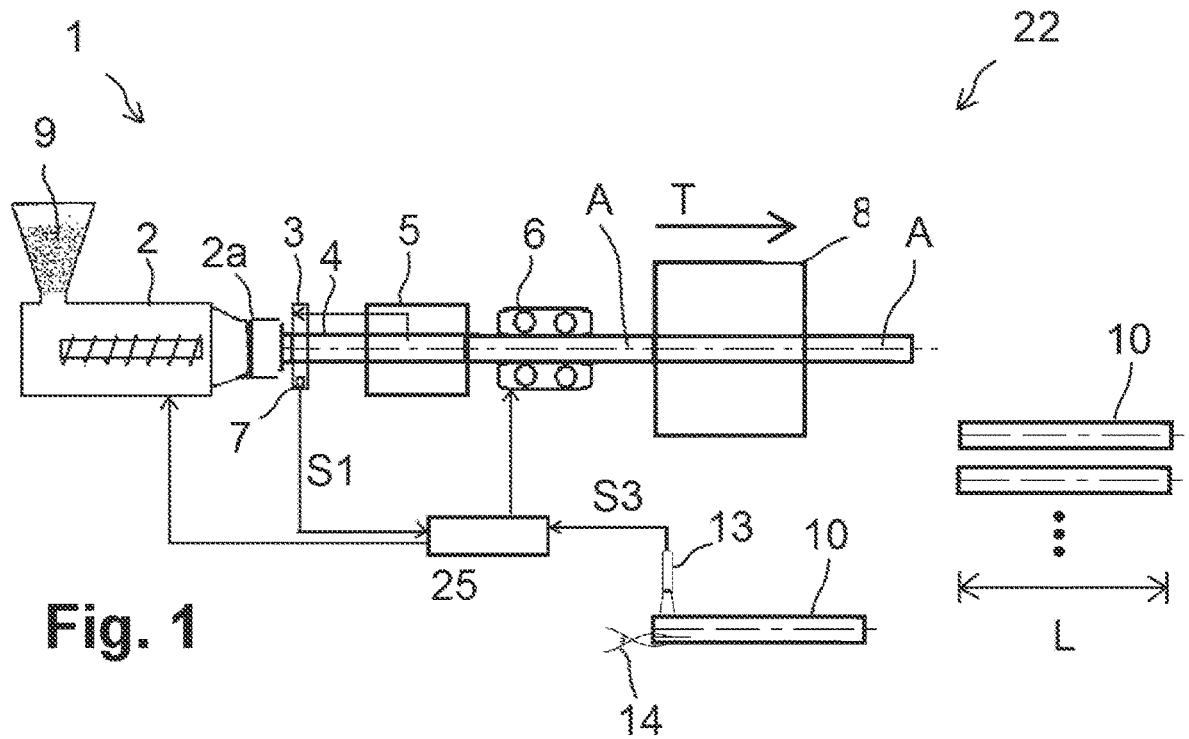
Fig. 1
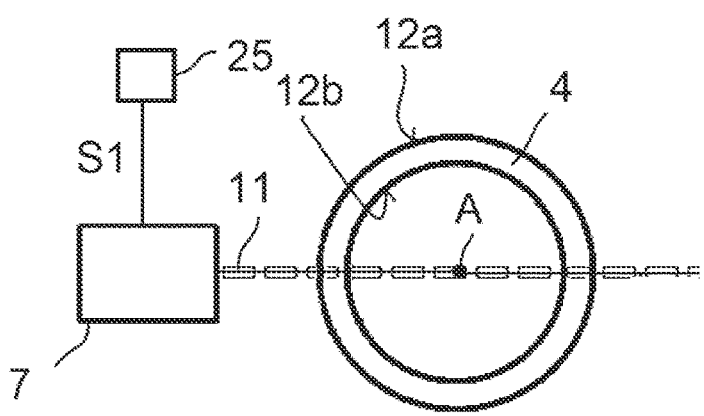
Fig. 4
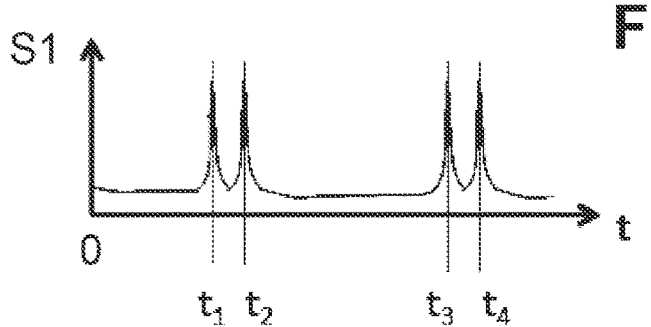

METHOD FOR CALIBRATING A THZ MEASURING DEVICE AND EXTRUSION AND MEASUREMENT SYSTEM

PRIORITY CLAIM

This application claims priority under 35 U.S.C. 119(e) to U.S. Provisional Application No. 63/297,310, filed Jan. 7, 2022, which is expressly incorporated by reference herein.

BACKGROUND

The present disclosure relates to a method for calibrating a THz measuring device in an extrusion line, and to a measuring and extrusion system.

SUMMARY

THz measuring devices are used, among other things, in extrusion lines to measure the extruded profiles. An extruder outputs a profile, in particular a pipe, which is subsequently measured by a THz measuring device for relevant geometric properties, e.g. its wall thickness as well as its outer diameter and inner diameter. In this process, terahertz radiation, which can also be in the radar and microwave range, is emitted by a THz transmitter and partially reflected at the boundary surfaces of the profile, so that the geometric properties can be determined directly or indirectly from transit times of the reflected signal. The refractive index of the material of the profile is generally also included in the determination of geometric properties such as wall thickness.

WO 2017/000933 A1 shows a terahertz measuring device in an extrusion line, whereby an extruded pipe with an initially unknown refractive index is measured. WO 2016/139155 A1 describes a device and method for measuring the diameter and/or wall thickness of a strand, wherein terahertz radiation is first output from a transmitter through an empty measuring space to a reflector in a blank measurement and the reflected beam is measured, and subsequently the measurement is performed with a measuring object to determine properties of the strand.

DE 10 2016 119 728 A1 describes a portable THz measuring device for determining at least one layer thickness of a test object, wherein a shaped aperture with a support contour is provided at the front end region of the THz measuring device, which enables vertical positioning of the THz measuring device on profiles with a predetermined diameter. The determination of both the geometric properties and the refractive index of a profile is thus generally difficult. Furthermore, errors or defects of the stationary THz measuring device can lead to deviations of the measurement results.

The present disclosure is based on the task of creating a method and an extrusion and measuring system that enable reliable measurement of profiles.

This task is solved by a method and an extrusion and measuring system according to the independent claims. The subclaims describe preferred further embodiments.

The process according to the present disclosure can be carried out in particular with the extrusion and measuring system according to the present disclosure. Thus, a stationary THz measuring device is provided in the extrusion line, which can measure the extruded profile inline, i.e. in the production line. This enables direct and continuous measurement during extrusion and generates a first measurement signal as a stationary THz measurement signal. Furthermore, two portable measuring devices are provided for measuring profile pieces which are separated from the extruded profile and subsequently cooled.

On the one hand, a reference measuring device is provided which is based on a measuring principle alternative to THz measurement and can directly determine the geometric wall thickness. In particular, the reference gauge has a measuring accuracy down to the micrometer range. In particular, a mechanical measuring device, ultrasonic measuring device and/or laser measuring device can be provided as a reference measuring device.

The mechanical measuring device can be designed as tongs or clamping device with clamping jaws for contact with wall surfaces of the profile piece.

Thus, the portable mechanical measuring device can be applied to the profile with a defined mechanical preload or predetermined mechanical pressure, so that reliable reproducible mechanical measurements are possible, especially without or without relevant deformation of the product, and thus a second measuring signal is generated as a mechanical mobile measuring signal. The ultrasonic measuring device is preferably applied to the profile piece from the outside, i.e. in particular perpendicularly to the outer surface of the profile piece, whereby, for example, a measuring head of the ultrasonic measuring device can be applied to the outer surface of the profile, e.g. with a gel for acoustic coupling which is applied to the measuring head.

Furthermore, a portable THz measuring device is provided, which can be applied to the profile piece by the user and—generally similar to the stationary measuring device—measures travel times between the wall surfaces. Thus, a subsequent measurement of the cooled profile piece is preferably performed according to the previous in-line measurement of the warm profile, in particular with the same electromagnetic characteristics such as frequency or frequency band. Thus, the portable THz measuring device may in particular have the same THz transceiver as the stationary inline measuring device; thus, a third measurement signal is generated as a mobile THz measurement signal Thus, preferably after extrusion, profile pieces are separated and preferably cooled first in order to be able to take into account the geometric properties of the finally cooled profile pieces. Cooling can also take place over a longer period of time, for example. For example, the profile piece can be separated and only measured further on the following day. Subsequently, the profile piece is measured twice. The measurement is performed reproducibly with both the reference measuring instrument and the portable THz measuring instrument, in particular at the same measuring point. For this purpose, the user can mark the measuring point in particular. In particular, the measuring point has a defined distance from one end of the profile piece so that, on the one hand, it is not too close to the end and is not influenced by mechanical deformations caused by the separation process; on the other hand, it also enables good accessibility for the reference measuring device, in particular for a mechanical reference measuring device that is applied from the end. For example, several measurements can also be carried out in the circumferential direction around the profile piece at the defined distance in order to enable an average wall thickness in the defined measuring areas or measuring points.

Through the reference measurement with the alternative measuring principle, the wall thickness can be reliably determined independently of the refractive index of the THz radiation. This results in a calibration of the subsequently applied portable THz measuring device, so that the refractive index of the profile piece can be determined.

The stationary THz measuring device is subsequently calibrated with the determined refractive index, i.e. the determined refractive index is used for the stationary THz measurements, which makes it possible to determine wall thicknesses from the stationary THz measurement signal.

Subsequently, the stationary THZ measurement can be compared with a measurement by the portable THz measuring device, i.e., in particular, a measurement with the portable THz measuring device can be performed on the warm profile directly after the stationary measurement.

Thus, a calibration of the stationary THz measurement signal of the still warm profile after extrusion to the final wall thickness formed in the cooled profile pieces can be performed, which results after shrinkage, so that deviations can already be directly detected and corrected inline, e.g. also as a control by suitable control of the extrusion line.

Furthermore, deviations or errors of the stationary THz measuring device can be determined by the comparison.

The measurement of the profile pieces by the portable equipment does not delay or interfere with the continuous extrusion of the profile. Also, measurements can be repeated by the user at will, if necessary. Such comparative measurements can be performed repeatedly during production, enabling high safety and accuracy without production delays. According to an advantageous design, the profile is marked at the measuring point. This marking can be done before or after the stationary THz measurement in the stationary THz measurement device. The marking can be done, for example, by means of a pen. In this way, the profile piece can be reliably measured again at the marked point even after it has cooled down, so that measurements at different points can be ruled out and a reliable comparison is possible.

In particular, a tube, i.e. round tube, can be extruded and measured as a profile, but also, for example, a rectangular profile, or even a layer, e.g. a foil, or semi-open profile, e.g. a rain gutter. According to the present disclosure, an extrusion and measurement system consisting of the extrusion line with the stationary THz measurement device, as well as the two portable measurement devices, i.e. the portable reference measurement device and the portable THz measurement device, is also provided.

According to the present disclosure, a method for THz measurement of profiles is preferably further provided, in which first the method according to the present disclosure for calibration of the stationary THz measuring device is carried out and subsequently a profile is extruded and measured with the calibrated stationary THz measuring device. Furthermore, a method for manufacturing and measuring profiles is preferably provided, in which a profile is extruded and subsequently the extruded profile is measured with the method for THz measurement and, depending on the THz measurement with the calibrated stationary THz measuring device, at least one control parameter of the manufacturing method, e.g. of an extruder and/or of a calibration sleeve, or of a puller for pulling off the profile, is changed.

In the following, the measuring signals are preferably designated as first to third measuring signal for clear identification, i.e. as stationary first THz measurement signal, mobile second measurement signal, and mobile third THz measurement signal. Thus, in this designation, the first and third measurement signals are THz measurement signals, and the second and third measurement signals are mobile measurement signals.

BRIEF DESCRIPTIONS OF THE DRAWINGS

Figure 5:
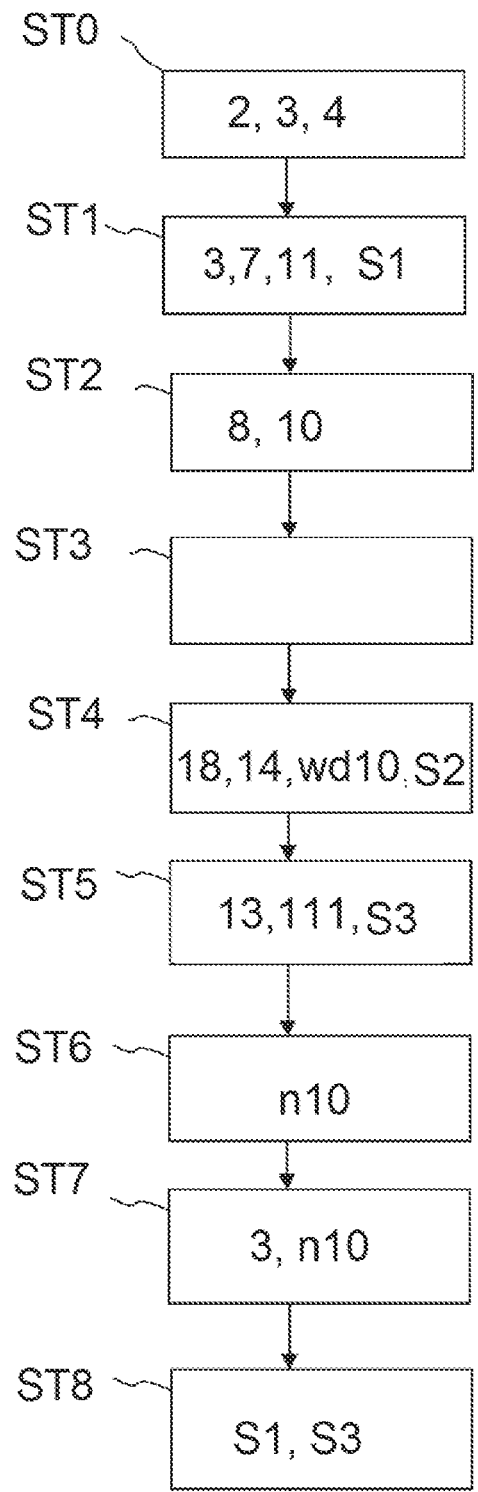

The present disclosure is explained in more detail below with reference to an embodiment shown in the accompanying drawings. The figures depict:

FIG. 1 an extrusion line with a terahertz measuring system according to an embodiment of the present disclosure;

FIG. 2, 3 the measurement of a profile piece by the reference measuring device 5 and the portable THz measuring devices;

FIG. 4 a signal diagram of the stationary THz measurement device;

FIG. 5 a flow diagram of a process according to the present disclosure.

DETAILED DESCRIPTION

According to FIG. 1, an extrusion line 1 includes an extruder 2 with a calibration sleeve 2a, a stationary THz measuring device 3, a cooling device 5, a haul-off 6 and a separating device 8.

Starting material 9, e.g. granules, pellets, powder or flakes of plastic material or rubber, possibly also with additives, is fed to the extruder 2 and discharged from the sizing sleeve 2a as an endless profile, here as a pipe 4 extrusion step ST0. The pipe 4 is withdrawn from the haul-off 6 and cooled in the cooling device 5, so that in particular the feed rate of the starting material 9, the conveying rate in the extruder 2, the haul-off speed of the haul-off 6 and the settings of the calibration sleeve 2a determine the formation of the pipe 4. The pipe 4 is subsequently divided into pipe pieces 10 of defined length L in the separating device 8.

After extrusion, an in-line measurement is performed in step ST1 by the stationary THz measuring device 3, which may have one or more THz sensors 7 arranged around the tube axis or symmetry axis A. The sensors 7 emit THz radiation 11 and detect reflected THz radiation, whereby geometric properties can be measured, in particular outer diameter D, inner diameter I, as well as wall thicknesses wd4 of the wall regions of the tube 4 determined. To form a multilayer tube 4, layer thicknesses or wall thicknesses of several layers can also be determined. In addition to these length dimensions, deformations such as ovality and sagging caused by material flow can also be determined from the measurement data.

The stationary THz measuring device 3 can, for example, perform direct time-of-flight measurements (time-in-5 flight), possibly also with frequency modulation and/or measurement with pulsed radiation, e.g. in the frequency range from 0.01 to 50 THz, in particular 10 GHz to 30 THz. Thus, the THz radiation 11 can also be in a range that fully or partially coincides or overlaps with radar radiation and/or microwave radiation.

In the stationary THz measurement, a stationary measurement signal S1 is determined according to the measurement diagram of FIG. 4 with signal peaks at the times t1, t2, t3, t4, which correspond to partial reflections at an outer wall surface 12a and an inner wall surface 12b of the front wall region and rear wall region. Thus, the time differences t2-t1 as well as t4-t3 depend on the geometric wall thickness wd4 as well as the refractive index n4 of the material of the tube 4. If the refractive index n4 is known, the wall thicknesses wd4, and correspondingly also other geometric dimensions of the tube 4, can thus be determined precisely—if the THz measuring device 3 is intact.

Basically, in FIG. 4, it is not necessary to measure the rear wall area of the pipe section 10, i.e. the measurement at times t3, t4, since an all-round measurement of the pipe section 10 can be carried out and thus each wall area can be measured as the front wall area.

In step ST2, a tube piece 10 is cut off from the tube 4 by the cutting device 8. Subsequently—and also already before cutting off—the tube piece 10 cools down according to the cooling step ST3, in particular to room temperature, whereby in particular a shrinkage (differential shrinking) ds, i.e. a relative change in dimensions, occurs.

One or more measuring points 18 are marked on the cut pipe section 10 at a distance d18, e.g. 2.5 inches (6.35 cm), from one of the pipe section ends 10a. In step ST4, a manual measurement is first performed according to FIGS. 2, 3 by means of a reference measuring device, which in this embodiment is applied as a mechanical measuring device 14 at the one or more measuring points 18. In particular, the mechanical measuring device 14 can be designed as a pair of pliers 14 with a micrometer sensor 15, wherein the pliers 14 are mechanically biased (preloaded) by a spring 16, i.e. the pliers jaws 17a and 17b engage the outer wall surface 12a and the inner wall surface 12b at the measuring point 18 with a predetermined force F or predetermined pressure, respectively. The user thus applies the mechanical measuring device 14 to the measuring point 18 from the end 10a of the cut pipe section 10 and receives a reference measuring signal S2 with a very accurate value of the geometric wall thickness wd10.

Figure 3:
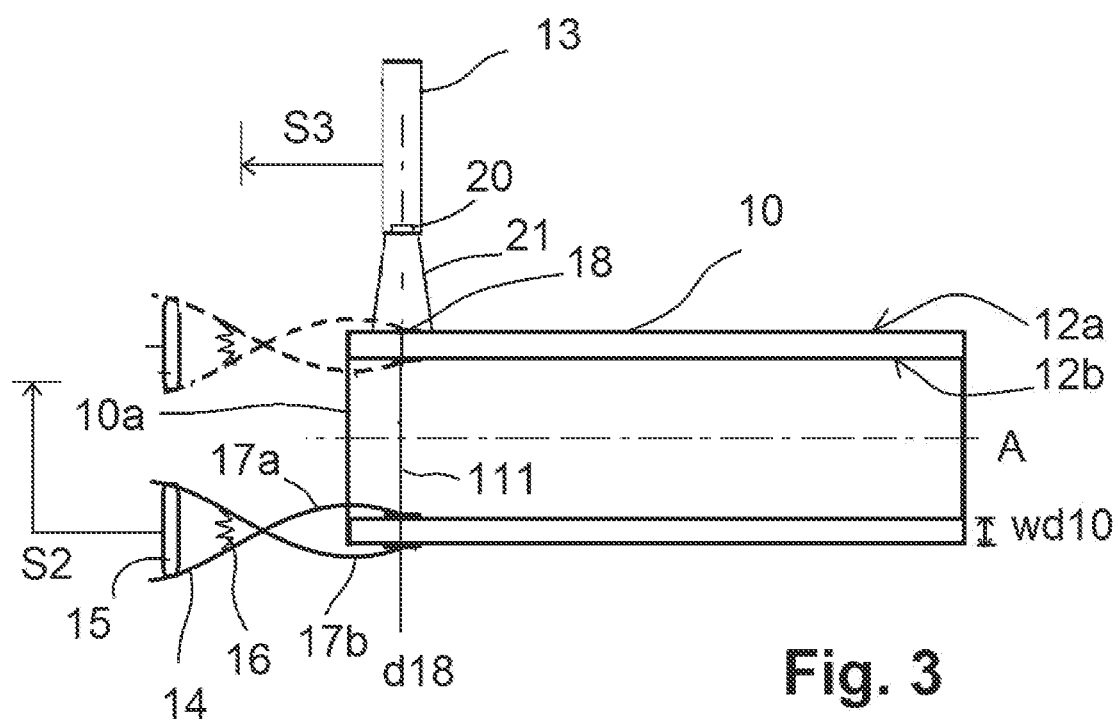

Subsequently, in step ST5, a mobile, manual THz measurement of the pipe section 10 is carried out at the same measuring point 18 by means of a portable THz measuring device 13, which is placed with its support contour 21 on the outer wall surface 12a. The support contour 21 ensures a defined support of the THz measuring device 13 perpendicular to the outer wall surface 12a, i.e. radially toward the tube axis A. In FIGS. 2 and 3, the measuring devices 13, 14 are thus placed at the same measuring point 18 on the profile piece 10; only for better illustration is the mechanical measuring device 14 shown in FIGS. 2, 3 supplementary also on the opposite side. In particular, the portable THz measuring device 13 has the same or similar components as the individual THz sensors 7 of the stationary THz measuring device 3, e.g., the same THz transceiver 20, i.e., it outputs THz radiation 111 corresponding to the THz radiation 11 of the stationary THz measuring device 3, in particular, the same measuring frequency and the same bandwidth. Thus, the portable THz measuring device 13 again provides a measurement signal S3 which basically corresponds to the diagram of FIG. 4, or at least enables a measurement of the front wall area with the time difference t2-t1.

ST6, calibration of the second THz measurement signal S3, i.e. determination of the refractive index n10:

The determined wall thickness wd10 is used to calibrate the second THz measurement signal S3 of the portable THz measurement device 13. Since the measurements were made at the same measurement location 18 at the same temperature, the wall thicknesses wd10 of the two measurements can be equated so that the refractive index n10 can be determined directly from the second THz measurement signal S3.

ST7, Calibration of the first THz measuring signal S1: The determined ref ractive index n10 is used for the calibration or evaluation of the first THz measuring signal S1 of the stationary THz measuring device 3. Thus, a calibration of the first measuring signal S1 or of the stationary measuring device 3, which measures the warm material of the tube 4, can be carried out to values which correspond to the later final formed profile piece 10, whereby in particular also a control of the production parameters, in particular of the extruder 2 and the haul-off 6, can be carried out directly.

ST8, comparison step:

According to an advantageous embodiment, a supplementary comparison measurement of the stationary THz measuring device 3 with the portable THz measuring device 13 is then carried out on the extruded tube 4, i.e. inline.

In particular, it can be assumed that due to the same or similar electronic components, in particular the same THz transceiver 21, the electronic measurements are comparable and, for example, the transit times t2-t1 of the two THz measurement signals S1, S3 should correspond.

Thus, an exact determination of the shrinkage ds or directly a calibration of the stationary measurement to the final values of the cooled profile piece is possible; furthermore, measurement errors, in particular also defects of the sensors 7 of the stationary THz measuring device 3, can be detected.

Thus, an extrusion and measuring system 22 is created, which comprises the extrusion line 1 with the extruder 2, the stationary THz measuring device 3, preferably the haul-off 6 for hauling off the extruded profile 4, the separating device 8, the reference measuring device 14, the portable THz measuring device 13, and the control and evaluation device 25.

The English portion of this specification is a translation of the German portion of the specification which follows below. To the extent there is any disagreement between the English portion and the German portion, the German portion will control as it relates to the technical description of the present disclosure.

The invention claimed is:

1. A method for calibrating a stationary THz measuring device which measures geometric properties of a profile during an extrusion of the profile by means of one or more THz sensors, the method comprising at least the following steps:

after extrusion of the profile step of stationary inline THz measurement step by outputting first THz radiation from one or more THz sensors of the stationary THz measuring device onto the profile, detecting the first THz radiation reflected at interfaces of the profile and outputting a first measurement signal of the stationary THz measuring device, reference measurement of a wall thickness at a measuring point of a profile piece by means of a reference measuring device on the basis of a reference measuring method alternative to THz measurement, with generation of a second measuring signal, measurement of the profile piece at the measuring point by means of a portable THz measuring device with generation of a mobile third measuring signal, calibration of the mobile third measurement signal on the basis of the second measurement signal, with determination of a refractive index of the profile piece, and calibration of the first measurement signal of the stationary THz measuring device on the basis of the determined refractive index of the profile piece.

2. The method of claim 1, wherein after the calibration of the first measuring signal, a comparison step is subsequently carried out, in which the extruded profile is measured by the stationary THz measuring device and subsequently still before the separation for comparison with the portable THz measuring device, and the first measuring signal of the stationary THz measuring device is compared with the third measuring signal of the portable THz measuring device, and depending on the comparison, the calibration is evaluated as successful.

3. The method of claim 2, wherein the step of comparison it is determined whether the determined values of the wall thicknesses lie within an accuracy range, e.g. by comparing a difference of the values with a limit value, and if the accuracy range is reached, e.g. if a difference of the values lies below a limit value, the calibration is evaluated as successful.

4. The method of claim 2, wherein the comparison measurement is performed by the portable THz measuring device directly after the stationary THz measurement and at the same measuring point of the profile, for better comparability of the first measuring signal and third measuring signal.

5. The method of claim 1, wherein the profile piece is produced by separating it from the extruded profile by means of a separating device after the extrusion and the step of stationary in-line measurement.

6. The method of claim 5, wherein the profile piece is actively or passively cooled after separation, in particular to a final temperature.

7. The method of claim 1, wherein one or more measurement sites are marked before or after the stationary THz measurement, for unambiguous location of the one or more measurement sites.

8. The method of claim 7, wherein several measuring points are marked and measured at a defined distance from the end of the profile piece and around the profile piece, in particular for a defined accessibility of the reference measuring device and/or to avoid the detection of deformations of the separation process.

9. The method of claim 1, wherein the stationary THz measuring device and the portable THz measuring device perform THz measurements with a same and/or overlapping frequencies or frequency range, in particular with a same transceiver.

10. The method of claim 1, wherein the stationary THz measuring device and/or the portable THz measuring device output THz radiation in the frequency range from 0.01 to 50 THz, in particular 0.02 to 30 THz, preferably 0.05 to 10 THz, in particular as time-of-flight measurement and/or frequency modulation and/or pulsed radiation.

11. The method of claim 1, wherein a tube is extruded as a profile and subsequently separated tube pieces are measured, wherein one or more of the following geometric properties of the tube and/or the tube pieces are determined: a wall thickness, an outer diameter, an inner diameter, deformations, in particular an ovality and/or sagging due to hot material.

12. The method of claim 1, wherein during the reference measurement and/or the measurement by means of the portable THz measuring device the reference measuring instrument and/or the portable THz measuring instrument is placed manually against an outer wall surface of the profile with a contact surface, e.g. a defined contact contour.

13. The method of claim 1, wherein the reference measurement step one or more of the following measuring devices are used as reference measuring device:
a mechanical measuring device for mechanical measurement of the profile,
an ultrasonic measuring device for ultrasonic measurement of the profile, and
a laser for laser measurement of the profile.

14. The method of claim 13, wherein as the mechanical measuring device, a pair of pliers is inserted into the profile piece from one profile piece end and clamping jaws are applied to a inner surface and a outer surface of the profile, in particular with a defined mechanical pretension.

15. The method of claim 13, wherein the ultrasonic measuring device is applied to the profile piece from the outside, e.g. with a gel applied to a measuring head of the ultrasonic measuring device.

16. An extrusion and measuring system for producing and measuring profile pieces, comprising:
an extrusion line comprising an extruder adapted to extrude profiles,
a stationary THz measuring device arranged downstream of the extruder for measuring an extruded profile, the THz measuring device comprising one or more THz sensors aligned with an axis of symmetry of the extrusion line, for measuring geometric properties of the extruded profile, a take-off for taking off the extruded profile, a separating device for separating profile pieces from the profile,
a reference measuring device which is set up to measure a reference wall thickness of a separated profile piece using a measuring method which is alternative to THz measuring a portable THz measuring device with a support contour, for placing on a separated profile piece and for measuring it, the portable THz measuring device being programmable and being designed to record a value of a determined wall thickness for calibration purposes, and a control and evaluation device which is set up and designed to record a determined refractive index via an interface and to determine geometric properties of the profile piece from at least the first measurement signal of the stationary THz measuring device on the basis of the determined refractive index.

17. The extrusion and measuring system of claim 16, wherein the measuring device is realized as one or more of the following devices:
a mechanical measuring device for mechanical measurement of the profile,
an ultrasonic measuring device for ultrasonic measurement of the profile, and
a laser for laser measurement of the profile.

* * * * *